(12) United States Patent
Bourget

(10) Patent No.: US 12,364,253 B2
(45) Date of Patent: Jul. 22, 2025

(54) BEEHIVES AND BEEHIVE STANDS

(71) Applicant: Josee Bourget, Hope Mills, NC (US)

(72) Inventor: Josee Bourget, Hope Mills, NC (US)

(73) Assignee: Josee Bourget, Hope Mills, NC (US)

( * ) Notice: Subject to any disclaimer, the term of this patent is extended or adjusted under 35 U.S.C. 154(b) by 0 days.

(21) Appl. No.: 18/586,103

(22) Filed: Feb. 23, 2024

(65) Prior Publication Data

US 2024/0284879 A1 Aug. 29, 2024

Related U.S. Application Data

(60) Provisional application No. 63/447,856, filed on Feb. 23, 2023.

(51) Int. Cl.
*A01K 47/00* (2006.01)
*A01K 47/06* (2006.01)

(52) U.S. Cl.
CPC .................................. *A01K 47/06* (2013.01)

(58) Field of Classification Search
None
See application file for complete search history.

(56) References Cited

U.S. PATENT DOCUMENTS

| | | | | |
|---|---|---|---|---|
| 4,291,424 A | * | 9/1981 | Angelis | A01K 47/06 6/4 R |
| 4,412,363 A | * | 11/1983 | Robson | A01K 47/06 6/4 R |
| 4,455,699 A | * | 6/1984 | Brown | A01K 47/06 6/4 R |

OTHER PUBLICATIONS

Freeman Beetle Trap, Arbico Organics, <https://www.arbico-organics.com/product/freeman-small-hive-beetle-trap/forecasting-methods-ipm>, publicly available as early as Oct. 30, 2020 (3 pages).

(Continued)

*Primary Examiner* — Joshua J Michener
*Assistant Examiner* — Henry Hooper Mudd
(74) *Attorney, Agent, or Firm* — Michael Best & Friedrich LLP

(57) ABSTRACT

Beehives and beehive stand are provided herein. A beehive stand for use as a base of a beehive can include a stand body having a first side wall and a second side wall and a top portion having an opening therethrough. Each of the first and second side walls include an inner wall face with a drawer slide groove and a bottom board slide groove in the respective inner wall face of the respective first and second side wall. The inner wall faces of first and second side walls face each other such that the drawer slide grooves in the respective inner wall faces align and the bottom board slide grooves in the respective inner wall faces align. The beehive stand includes a drawer having a drawer front secured to a litter tray. The litter tray having side portions that are configured to slide along the drawer slide grooves in the respective first and second side walls to allow the drawer to be inserted and held within the stand body and removed from the stand body. The beehive stand includes a bottom board having side portions that are configured to slide along the bottom board slide grooves in the respective first and second side walls to allow the bottom board to be inserted and held within the stand body and removed from the stand body. A screen is secured to the top portion of the stand body covering the opening in the top portion, the screen residing above the litter tray of the drawer when the drawer is inserted in the stand body along the drawer slide grooves of the first and second side walls.

21 Claims, 7 Drawing Sheets

(56) References Cited

OTHER PUBLICATIONS

IPM Screened Bottom Board, Mannlake, <https://www.mannlakeltd.com/hives-components/hive-covers-bottom-boards/ipm-screened-bottom-board/?sku=WW090&msclkid=45616bba34ac1bf1f4d90cbe2cb5b294>, publicly available as early as Jan. 29, 2023 (4 pages).

* cited by examiner

ROUGH SCALE

BEEHIVES AND BEEHIVE STANDS

RELATED APPLICATIONS

The presently disclosed subject matter claims the benefit of U.S. Provisional Patent Application Ser. No. 63/447,856, filed Feb. 23, 2023, the disclosure of which is incorporated herein by reference in its entirety.

TECHNICAL FIELD

The present subject matter relates to beehives, beehive stands and related methods. In particular, the present subject matter relates to Langstroth beehives and hive stands that form the base of such beehives and methods related to such beehives and hive stands.

BACKGROUND

Beehives provide a homes for bees that make it easy for beekeepers to access for removal of honeycomb and honey from the beehive. Traditionally, the beehives, or hives, have a base, or bottom board, that is solid. These solid bottom boards are most used by beekeepers. The bees constantly work at keeping their hive clean of foreign materials and free of pests, but it is necessary for beekeepers to make sure that the bottom board stays debris free as much as possible. This is to help prevent disease and pest invasion. For example, hive beetles tend to drop to the bottom as bees chase them away but climb back up into the nest to lay eggs and sour the honey crop. Their larvae also feed from the nest litter and become adult beetles that promote infestation. As tiny as they are, the Varroa mites, which carry viruses and are the number one enemy of honey bees, can and do climb back up as well.

An alternative to the solid bottom board is the screened bottom board, which lets the beetles, mites, and other nest waste fall to the ground. However, it does not offer any insulation from winter conditions. Ambient air temperature is of great concern to honeybee colonies. Bees strive to keep the center of the cluster between about 92° F. and about 95° F. year round, while the mantle averages about 48° F. in the winter. Condensation and moisture cause bees, and subsequently the colony, to chill and die. The chilling effect prevents the bees from moving about to feed and maintain proper body temperature, which in turn inhibits them from using their muscles to warm up the cluster as needed. That means beekeepers have to swap out bottom board if they wish to protect the bees from the cold draft and humidity coming from the ground that contribute to the chilling effect. This is why most beekeepers use the traditional solid bottom permanently. Plans to move further north made me ponder over the screened bottom designs.

The open screened bottom issue mentioned above is somewhat mitigated by adding slides under the screened bottom to insert a piece of corrugated plastic board, which is called an IPM board, with an optional stick-on grid. It slides in right below the wire mesh but offers no means of preventing the pests from getting back up into the hive other than a bit of distance. In addition, the debris gets caught and dragged across the wood ware right above, when pulling the board out. That defeats the efforts of noting what type of debris fell onto the IPM board, which is helpful to beekeepers. The stick on paper gets dirty and impossible to clean without eventually replacing the entire IPM board. This setup is also open to critters since it is not fully enclosed; not to mention that this would not provide adequate insulation for winter.

As such, a need exists for a beehive and hive stand that make removal and monitoring waste easier, while at the same time reduce moisture and condensation build up to allow a beekeeper to better monitor and prolong the life of their bees within a beehive.

SUMMARY

The present subject matter relates to beehives, beehive stands and related methods. In particular, the present subject matter relates to Langstroth beehives and hive stands that form the base of such beehives. Methods related to the assembly and use of the beehives and hive stands disclosed herein are also provided.

Thus, it is an object of the presently disclosed subject matter to provide beehives and beehive stands as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
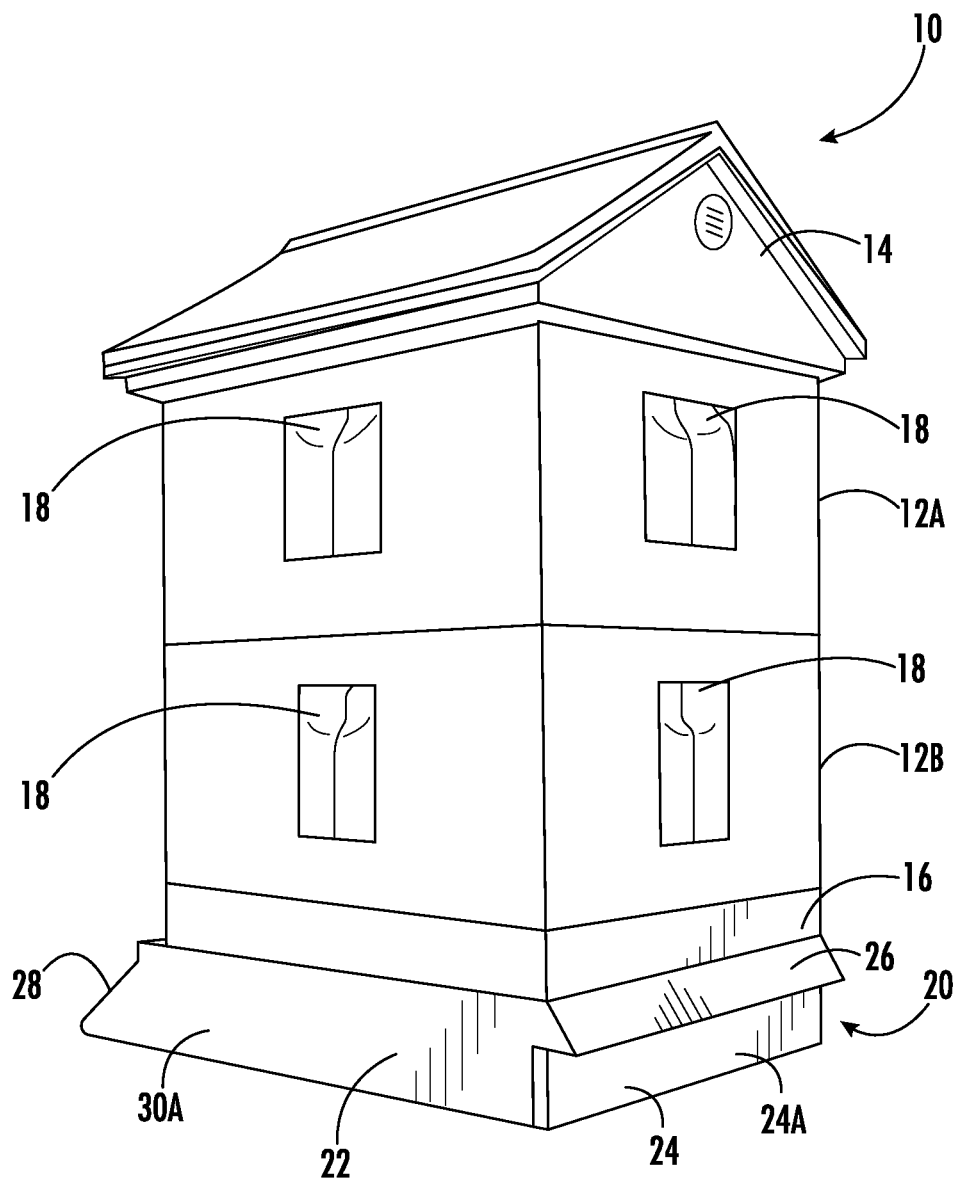
FIG. 1 illustrates a perspective view of an embodiment of a Langstroth bee hive according to the present subject matter.
Figure 2:
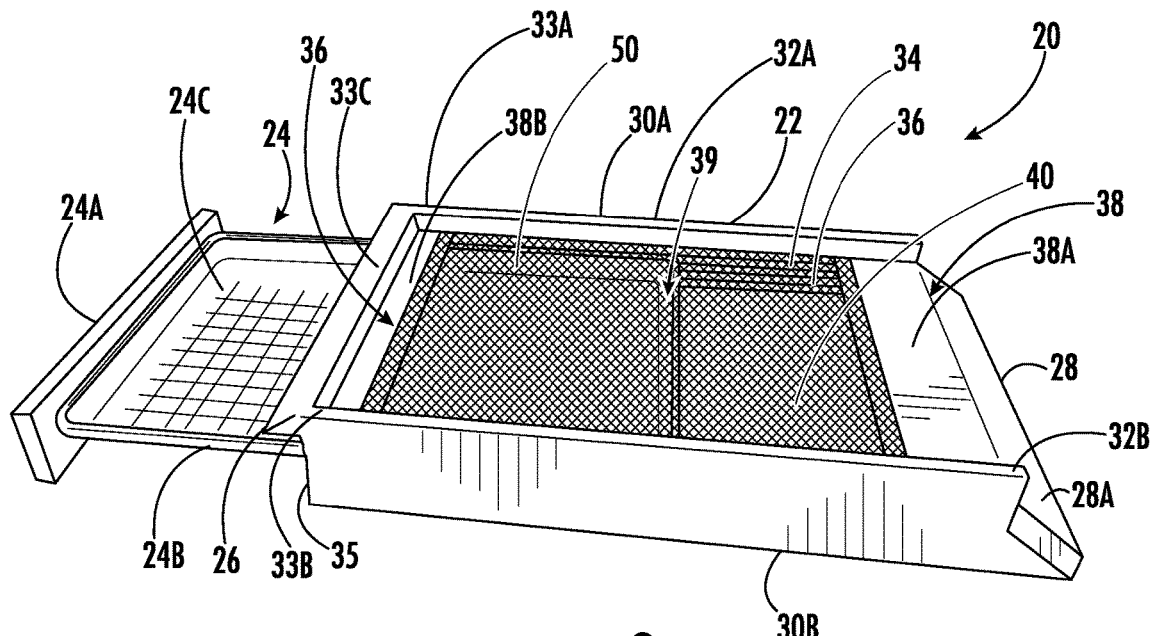
FIG. 2 illustrates a side perspective view of an embodiment of a hive stand according to the present subject matter with an embodiment of a drawer partially pulled outward from the hive stand.
Figure 3:
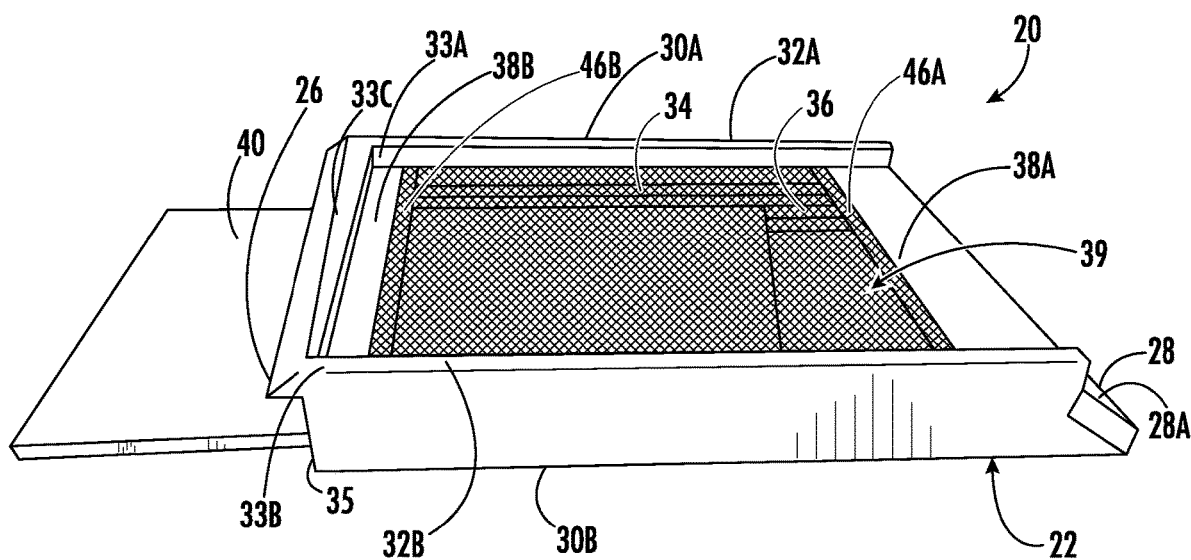
FIG. 3 illustrates a side perspective view of the embodiment of the hive stand according to FIG. 2 with the drawer removed and an embodiment of a bottom board partially pulled out from the hive stand.
Figure 4:
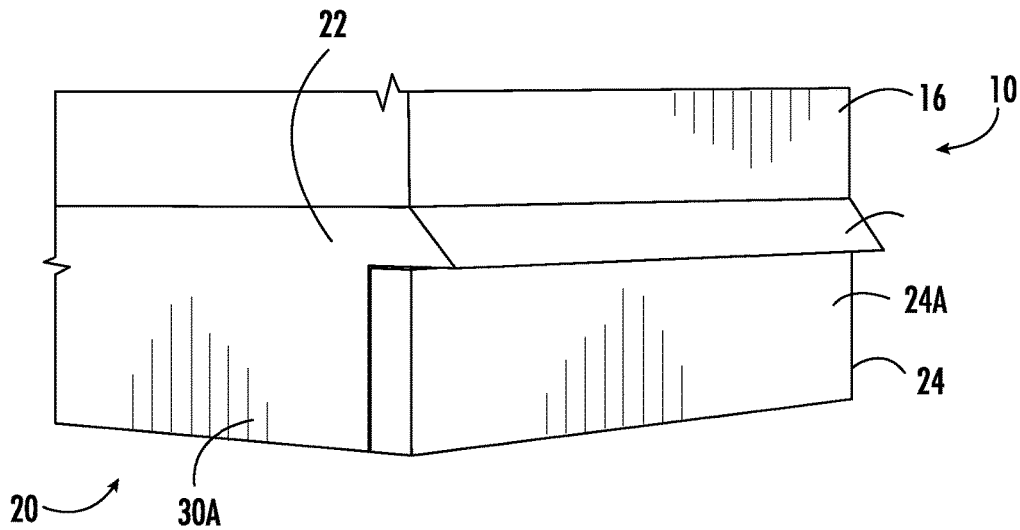
FIG. 4 illustrates a partial side perspective view of an embodiment of the hive stand according to FIG. 2 with the drawer in a closed position according to the present subject matter.
Figure 5:
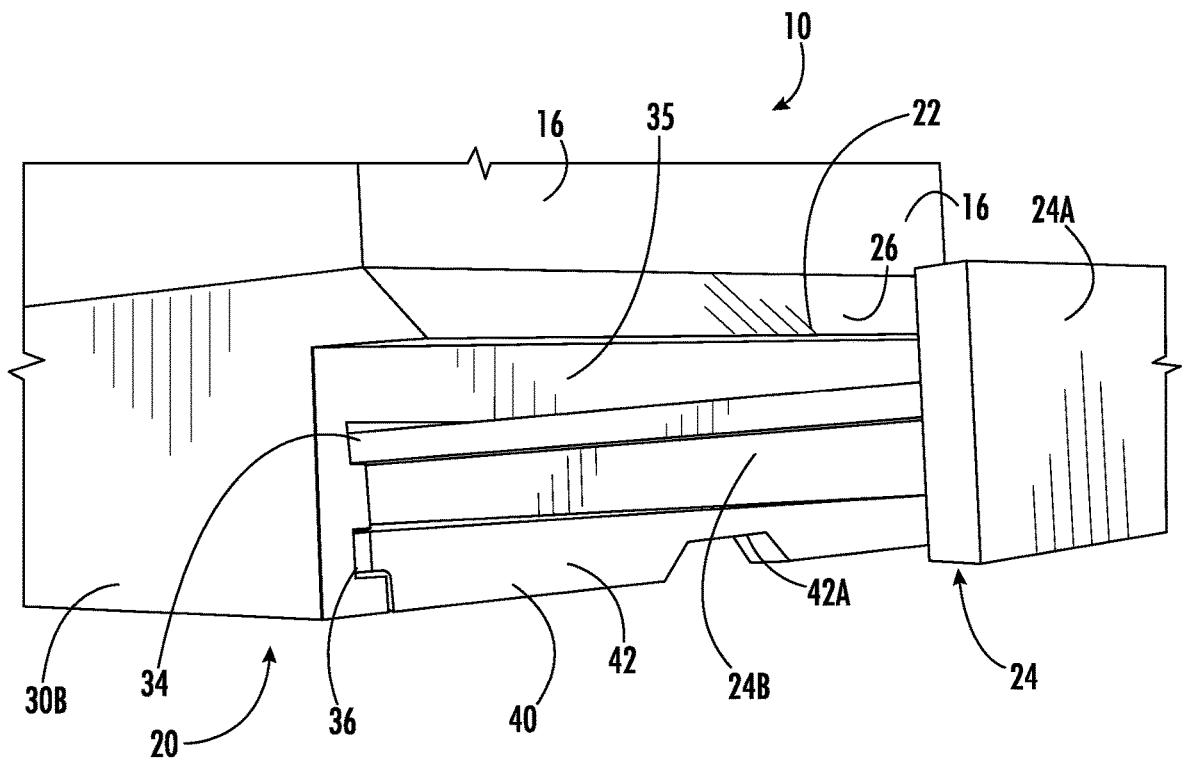
FIG. 5 illustrates a partial side perspective view of the embodiment of the hive stand according to FIG. 2 with the drawer in a partial open position according to the present subject matter.
Figure 6:
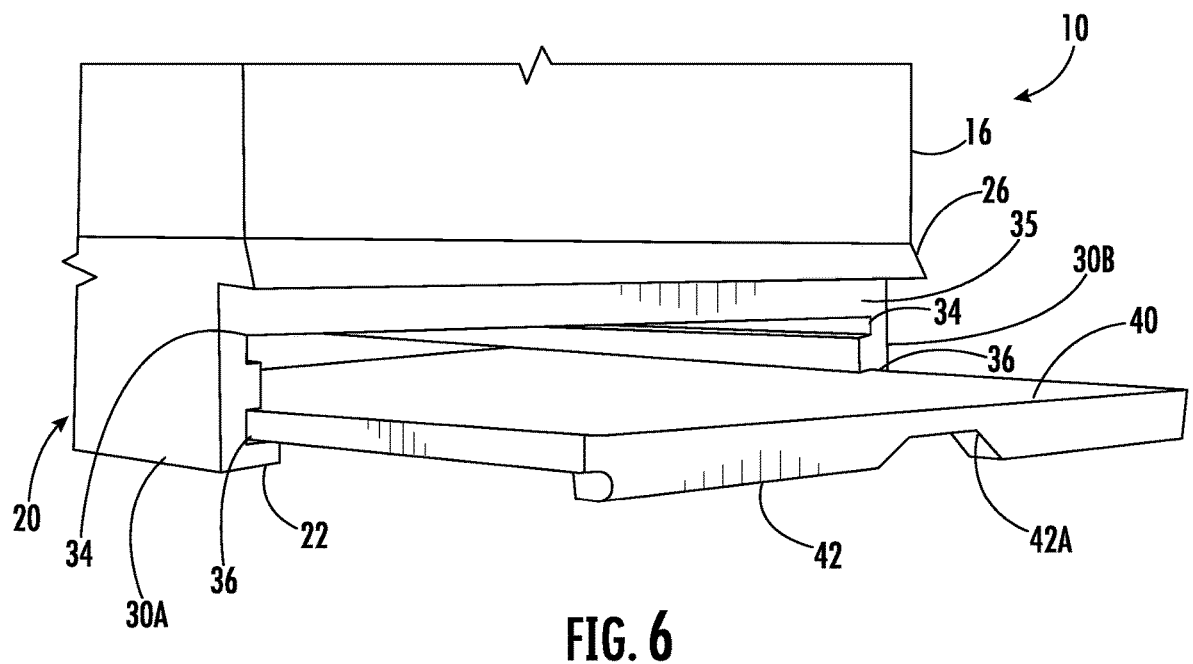
FIG. 6 illustrates a partial side perspective view of the embodiment of the hive stand according to FIG. 2 with the drawer removed and the bottom board being partially pulled out, or partially removed, according to the present subject matter.

Repeat use of reference characters in the present specification and drawings is intended to represent the seam or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, top, bottom, upper lower, vertical, horizontal, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer, or section. Thus, a first feature, element, component, region, layer, or section discussed below could be termed a second feature, element, component, region, layer, or section without departing from the teachings of the disclosure herein. Additionally, such terms as right, left, front, back, top, bottom, upper lower, vertical, horizontal, etc. are simply describing the relative position or movement of the features or elements to each other and do not necessarily mean an absolute position or movement since the relative position or movement depends upon the orientation of the device to the viewer and/or user.

Similarly, when a feature or element is being described in the present disclosure as "on" or "over" another feature or element, it is to be understood that the features or elements can either be directly contacting each other or have another feature or element between them, unless expressly stated to the contrary. As above, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements, or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

As used herein, the term a "plurality" means two or more.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

The present subject matter relates to beehives, beehive stands and related methods. In particular, the present subject matter relates to Langstroth beehives and hive stands that form the base of such beehives. Methods related to the assembly and use of the beehives and hive stands disclosed herein are also provided.

Thus, the present disclosure relates to beehives and beehive stand for use as a base of a beehive that provides a more compact construction with beehive stand being configured to several functions that were performed by multiple separate and independent section within traditional beehives. The beehive stand can comprise a stand body comprising a first side wall and a second side wall as well as a top portion. The top portion can have an opening therethrough. Each of the first and second side walls can comprise an inner wall face with a drawer slide groove and a bottom board slide groove in the respective inner wall face of the respective first and second side wall. The inner wall faces of first and second side walls face each other such that the drawer slide grooves in the respective inner wall faces align and the bottom board slide grooves in the respective inner wall faces align. The beehive stand also can comprise a drawer comprising a drawer front secured to a litter tray. The litter tray can have side portions that are configured to slide along the drawer slide grooves in the respective first and second side walls to allow the drawer to be inserted and held within the stand body and removed from the stand body as needed or desired. Additionally, the beehive stand can comprise a bottom board having side portions that are configured to slide along the bottom board slide grooves in the respective first and second side walls of the stand body to allow the bottom board to be inserted and held within the stand body and removed from the stand body as needed or desired. Further, the beehive stand also can comprise a screen secured on a top portion of the stand body covering the opening in the top portion. The screen resides over the opening in the top portion above the litter tray of the drawer when the drawer is inserted in the stand body along the drawer slide grooves of the first and second side walls.

Among other features, some embodiments of the stand body can comprise a landing board on a front end on the stand body. The landing board can be sloped to provide a landing area for bees. Additionally, some embodiments of the beehive stand can comprise a rain guard extending from the stand body above the where the drawer is inserted in the stand body. The rain guard can have a slope surface extending outward from the rear top portion such that the rain guard overhangs the drawer front when the drawer is in a closed position to aid in preventing rain from entering the beehive stand around the drawer. These and other features of the beehives and beehive stands disclosed herein are described in more detail below in reference to the Figures.

Referring to FIG. 1, an embodiment of a beehive, generally designated 10, is provided. The beehive 10 can comprise a variety of different sections and components including, but not limited to, one or more brood chambers, one or more honey supers, frames for inclusion in the brood chambers and honey supers, a queen excluder, a beehive stand (i.e., hive stand), slatted rack between the hive stand and the one or more brood chambers, an inner cover and an outer cover that reside atop the hive covering the top of the one or more honey supers and brood chambers, and an entrance reducer that can be placed at the entrance of the beehive adjacent a landing board of the hive stand that can be used to reduce the size of the hive entrance when needed, for example during cold weather. The materials used within embodiments of the sections of the beehive 10 can be any material deemed appropriate in beehive construction, including wood, plastics, and metals as traditional recognized.

In the embodiment shown in FIG. 1, the beehive 10 comprises a first brood chamber 12A residing atop second brood chamber 12B. Each of the brood chambers 12A, 12B can contain frames (not shown therein in which the bees build their honeycombs. Covers 14 can reside over the first, or top brood chamber, 12A that close the top of the beehive 10. The covers 14 can comprise an inner cover (not shown) and a separate outer cover. The outer cover of the covers 14 can have a sloped A-frame roof as shown or a flat roof, or a flat sloped roof not shown. The A-frame roof outer cover of covers 14 can be useful in diverting rain from a front side and rear side of the beehive 10, can improve ventilation to reduce condensation, and can provide space for a feeding jar which the bees can access through the inner cover of the covers 14. The second brood chamber 12B can reside atop a slatted rack 16 used to help with ventilation and hive congestion within the beehive 10. The slatted rack 16 can give the bees more room between an entrance and the second brood chamber 12B. The brood chambers 12A, 12B can also include brood chamber handles 18 on one or more sides of the chambers 12A, 12B to allow easier movement of the brood chamber 12A, 12B as needed. The slatted rack 16 in the beehive 10 in FIG. 1 resides atop a beehive stand generally designated 20, which is described in more detail below.

The beehive stand 20 can combine a screen 50, a litter tray drawer 24, and a bottom board 40 into a single unit that has a lesser height SH (see FIG. 9) than when a beehive has these elements as separate sections therein. For example, in some embodiments, the height SH can be about 3.5 inches. In some embodiments, the height SH can be about 4.5 inches. In some embodiments, the height SH can be about 5 inches. Referring to FIGS. 2-10, the beehive stand 20 can comprise a stand body 22 that can include a landing board 28 on a front side of the beehive 10 and a drawer 24 having a drawer front 24A on the rear side of the beehive 10. A rain guard 26 can extend outward from the rear side of the stand body 22 overhanging the drawer 24 and drawer front 24A when the drawer 24 is in a closed position. Since the drawer 24 will be opened and closed to help clean the beehive 10 as explained further below, propolis provided by the worker bees cannot be used by the bees to seal the cervices around the drawer 24. The rain guard 26 can be used to divert the rain from around the drawer to prevent rain from infiltrating the beehive 10 around the crevices between the stand body 22 and the drawer 24. Additionally, the beehive stand 20 can comprise a bottom board 40 (see FIGS. 2 and 3) that can reside within the stand body 22 below the drawer 24 as described further below. The bottom board 40 can comprise a face board 42 that extends downward that can include a handle groove 42. The face board 42 of the bottom board and the handle groove 42 can be used to facilitate removal of the bottom board 40 from the stand body 22.

Referring to FIGS. 2-10, the stand body 22 can comprise a first side wall 30A and a second side wall 30B. The first and second side walls 30A, 30B Each of the first and second side walls 30A and 30B can respectively comprise an inner wall face with a drawer slide groove 34 and a bottom board slide groove 36 in the respective inner wall face of the respective first and second side wall 30A and 30B. The inner wall faces of first and second side walls 30A, 30B face each other such that the drawer slide grooves 34 in the respective inner wall faces of the first and second side walls 30A, 30B align with each other and the bottom board slide grooves 36 in the respective inner wall faces of the first and second side walls 30A, 30B align each other. The drawer slide grooves 34 and the bottom board slide grooves 36 of the first and second side walls 30A, 30B allow for insertion and removal of the drawer 24A and bottom board 40 from the stand body 22 and the hive stand 20.

Figure 12:
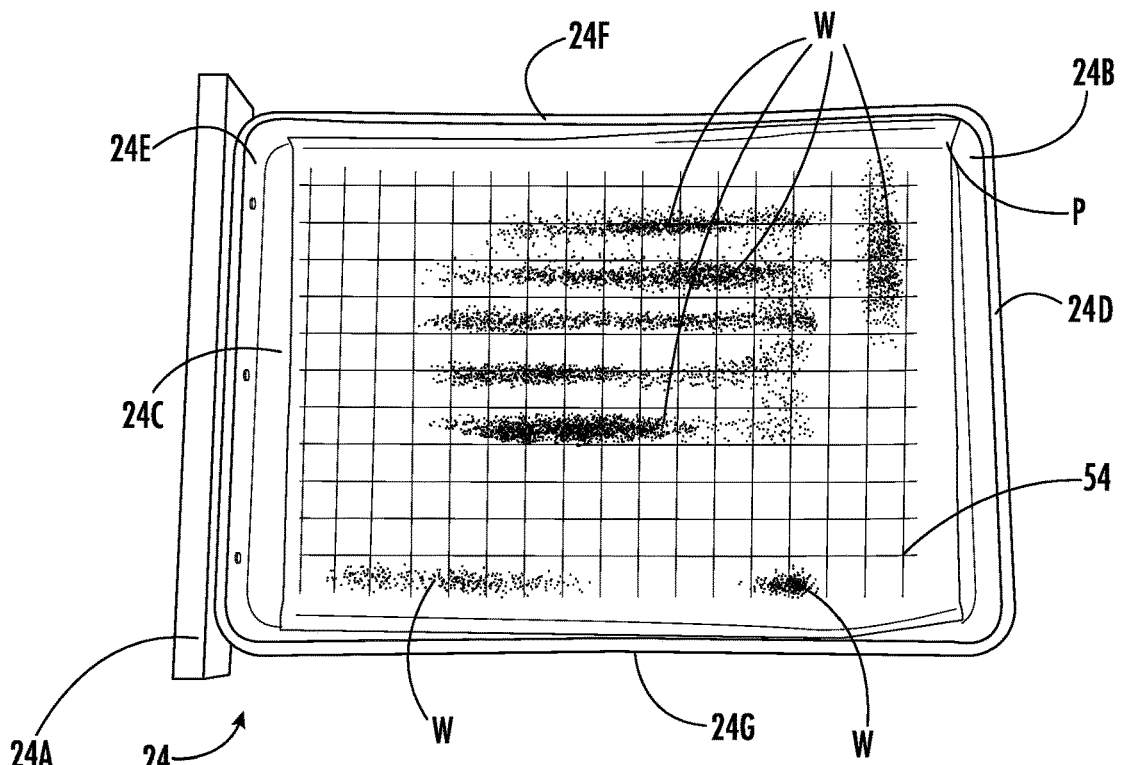
FIG. 12 illustrates a top plan view of and embodiment of a drawer according to the present subject matter that has been in use in an embodiment of the hive stand according to FIG. 2.

The drawer 24 can further comprise a litter tray 24B secured to the drawer front 24A. The litter tray 24B of the drawer 24 can comprises a bottom portion having a bottom surface 24C with front and rear end walls 24D, 24E and two side walls 24F, 24G that extend between the front and rear end walls 24D, 24E. While shown as a flat surface, the bottom surface 24C can have a contoured surface such as an undulating surface. In some embodiments, the front end wall 24D and rear end wall 24E of the litter tray 24B can be about parallel to each other and the side wall 24F and the side wall 24G can extend about parallel to each other. The front and rear end walls 24D, 24E and the side walls 24F, 24G of the litter tray 24B of the drawer 24 can extend upward from the bottom surface 24C of the bottom portion. The litter tray 24B with its bottom surface 24C on the bottom portion is used to catch waste that falls out of the brood chamber 12A, 12B and other sections of the beehive 10. As shown in FIG. 12, in some embodiments, the bottom surface 24C of the bottom portion of the litter tray 24B can comprise grid lines 54 thereon for visual referencing and collection of metrics related to waste W that falls from sections, such as the brood chambers 12A, 12B of the beehive 10. In some embodiments, a sheet or a disposable sheet that has gridlines thereon can be laid on the bottom surface 24C of the litter tray 24B instead of having gridlines on the bottom surface 24C itself. When the drawer 24 is in a closed position in some embodiments as shown, the drawer front 24A can extend to be about flush with a bottom of the stand body 22 and can cover the bottom board slide grooves 36 in the first and second side walls 30A, 30B such that the drawer 24 must be removed to remove the bottom board 40. Further, in some embodiments, the drawer front 24A can reside against the rear end 35 of the stand body 22 when in a closed position such that the drawer front 24A aligns and is about flush with the rest of the rear of walls of the sections of the beehive 10.

The litter tray 24B can have side portions that are configured to slide along the drawer slide grooves 34 in the respective first and second side walls 30A, 30B to allow the drawer 24 to be inserted and held within the stand body 22 and, when needed or desired, removed from the stand body 22. For example, the two side walls 24F, 24G of the litter tray 24B can have peripheral edges, or rails, that are configured to slide within the drawer slide grooves 34 in the respective first and second side walls 30A, 30B. Similarly, the bottom board 40 of the beehive hive stand 20 can have side portions that are configured to slide along the bottom board slide grooves 30 in the respective first and second side walls 30A, 30B of the stand body 22 to allow the bottom board 40 to be inserted and held within the stand body 22. When needed, the bottom board 40 can then be removed from the stand body 22 as it is shown in the process of being removed in FIGS. 3 and 6. The face board 42 with the handle groove 42A of the bottom board 40 can be used to remove the bottom board 40 from the beehive stand 20 as mentioned above.

The stand body 22 can also comprise a top portion, generally designated 38. The top portion 38 can have an opening 39 therethrough. The beehive stand 20 can also comprise a screen 50 that can be secured on a top portion 38 of the stand body 22 covering the opening 39 in the top portion 38. The screen 50 can reside over the opening 39 in the top portion 38 above the litter tray 24B of the drawer 24 when the drawer 24 is inserted in the stand body 22 along the drawer slide grooves 34 of the first and second side walls 30A, 30B.

Figure 9:
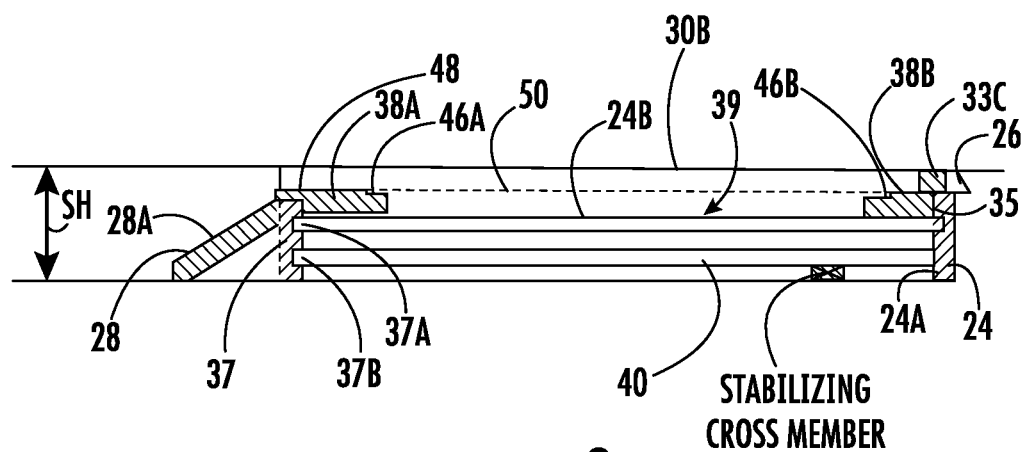
FIG. 9 illustrates a side vertical cross-sectional view of the embodiment of the hive stand according to FIG. 2

For example, in some embodiments of the hive stand 20 as shown in FIGS. 2, 3, 7, 9, and 10, the top portion 38 can comprise a front top portion 38A and a rear top portion 38B with the opening 39 between the front top portion 38A and the rear top portion 38B of the stand body 22. The sides of front top portion 38A can extend between the first and second side walls 30A, 30B. Additionally, the front top portion 38A can extend on one side above the landing board 28 and extend backward toward the rear end 35 of the stand body 22 while leaving the opening 39 between the front top portion 38A and the rear top portion 38B. The front top portion 38A of the stand body 22 can comprise a front end, a rear end, a top side, and a bottom side. Similarly, the rear top portion 38B can extend between the side walls 30A, 30B at the rear end 35 of stand body 22 and the rear top portion 38B of the stand body 22 can comprise a front end, a rear end, a top side, and a bottom side. As shown in FIG. 9, the front top portion 38A has a landing board channel 48 in the bottom side of the front end of the front top portion 38A for receiving a top portion of the landing board 28 underneath the front top portion 38A. In some embodiments as shown in FIG. 9, the stand body 22 comprises a front end wall 37 that extends downward behind the landing board 28 under the landing board channel 48 in the front top portion 38A of the stand body 22. The front end wall 37 can have an inner face with a drawer channel 37A into which a portion of the front end wall 24D of the litter tray 24B of the drawer 24 can be inserted when the drawer 24 is in a closed position. Similarly, the inner face of the front end wall 37 can have a bottom board channel 37B in which a front portion of the bottom board 40 can be inserted when the bottom board 40 is in an installed position. The landing board 28 can reside against sloped ramped portions 52 that extend out from the first and second side walls 30A, 30B. The landing board 28 can reside against sloped ramped portions 52 that extend out from the first and second side walls 30A, 30B as shown in FIG. 11. The landing board channel 48 provides for a smooth transition between a surface 28A of the landing board 28 and the front top portion 38A of the hive stand 20 that can be about flush to reduce potential infiltration of moisture. Thus, the depth of the landing board channel 48 can vary depending on the presence and thickness of the front end wall 37 as long as the end of the front top portion 38A extends over the top of the landing board 28. For example, in some embodiments, the landing board channel 48 can have a depth that allows for about a ¼ inch over joint.

Figure 7:
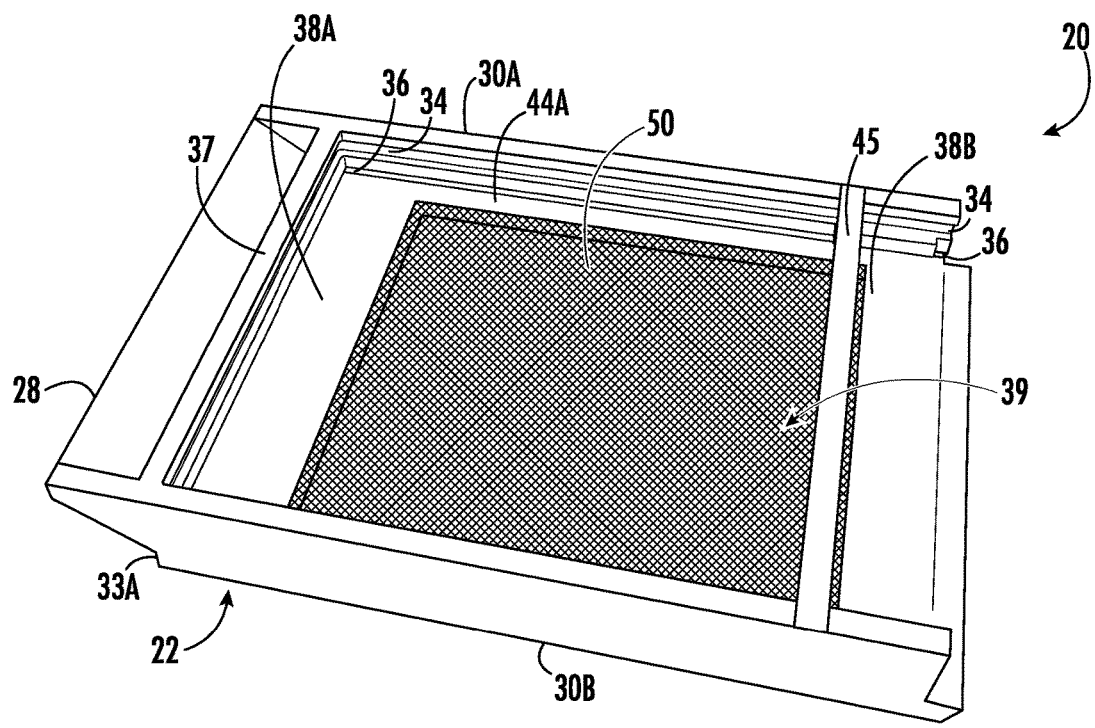
FIG. 7 illustrates a bottom perspective view of the embodiment of the hive stand according to FIG. 2 with the drawer and the bottom board removed according to the present subject matter.
Figure 8:
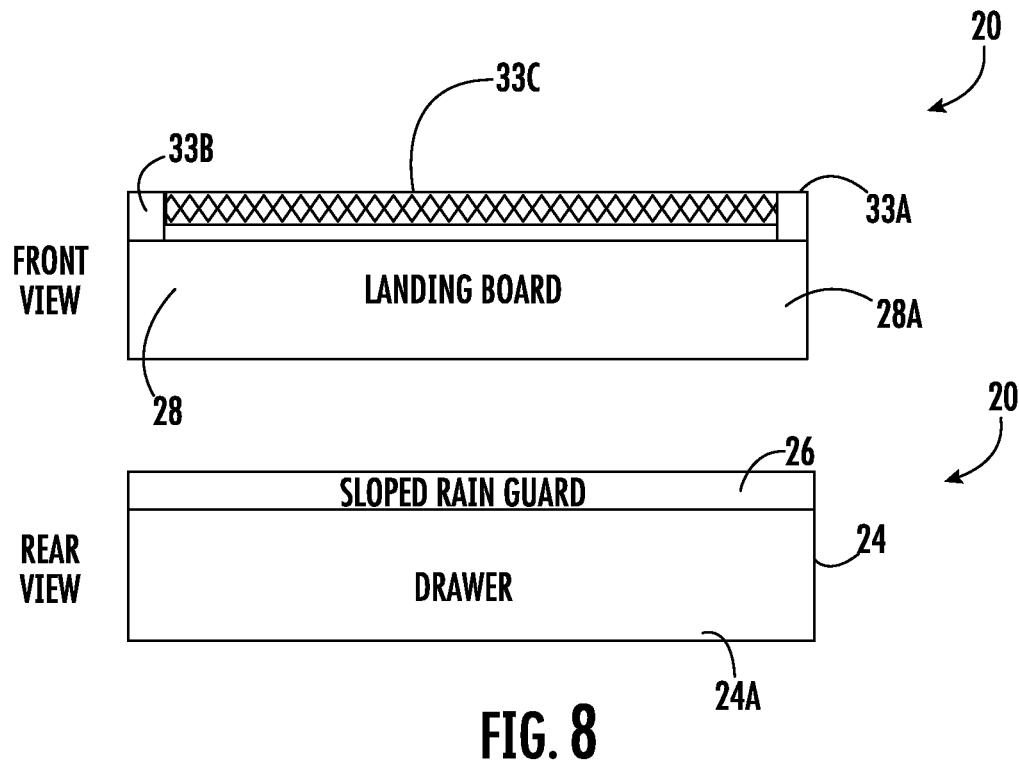
FIG. 8 illustrates a front side plan view of the embodiment of the hive stand according to FIG. 2 and a rear side plan view of the embodiment of the hive stand according to FIG. 2.
Figure 10:
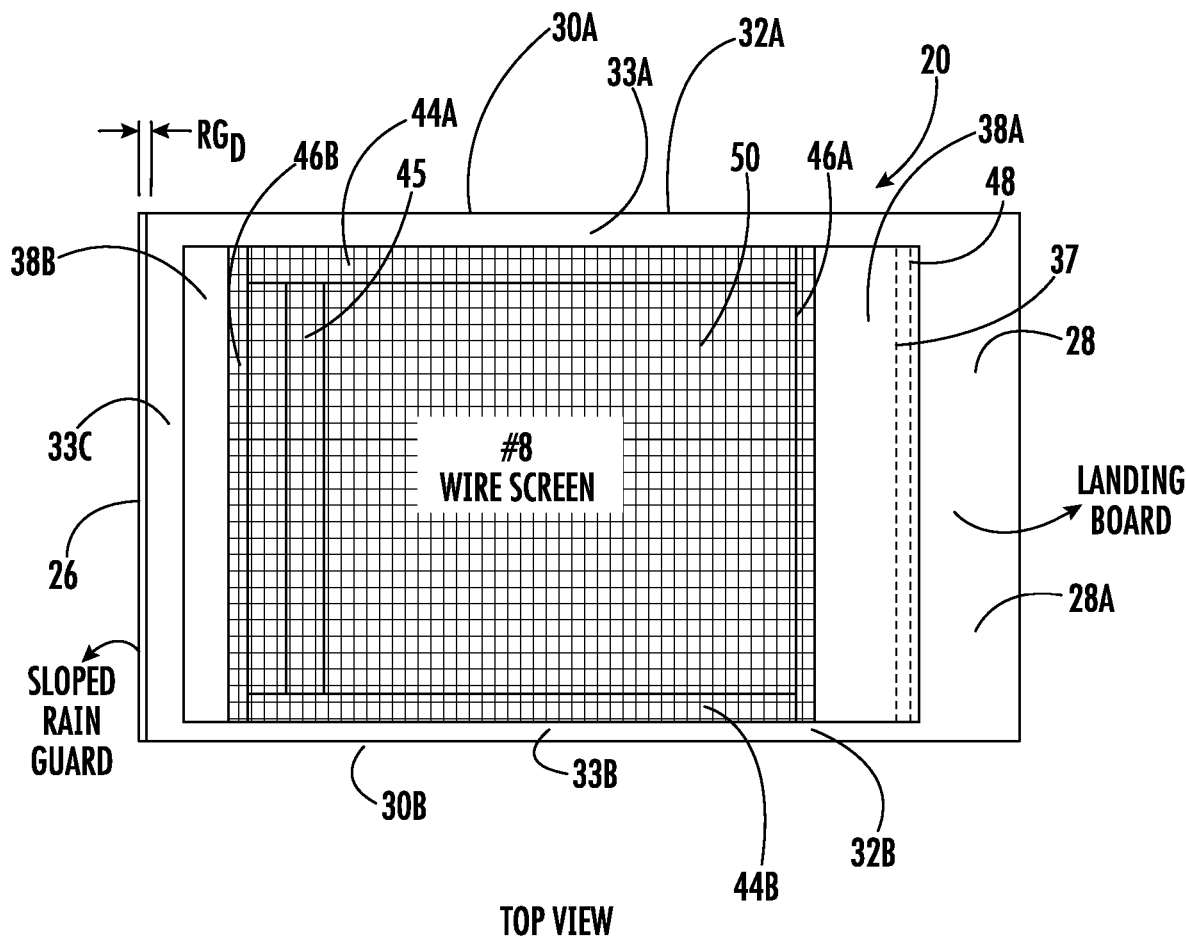
FIG. 10 illustrates a top plan view of the embodiment of the hive stand according to FIG. 2.
Figure 11:
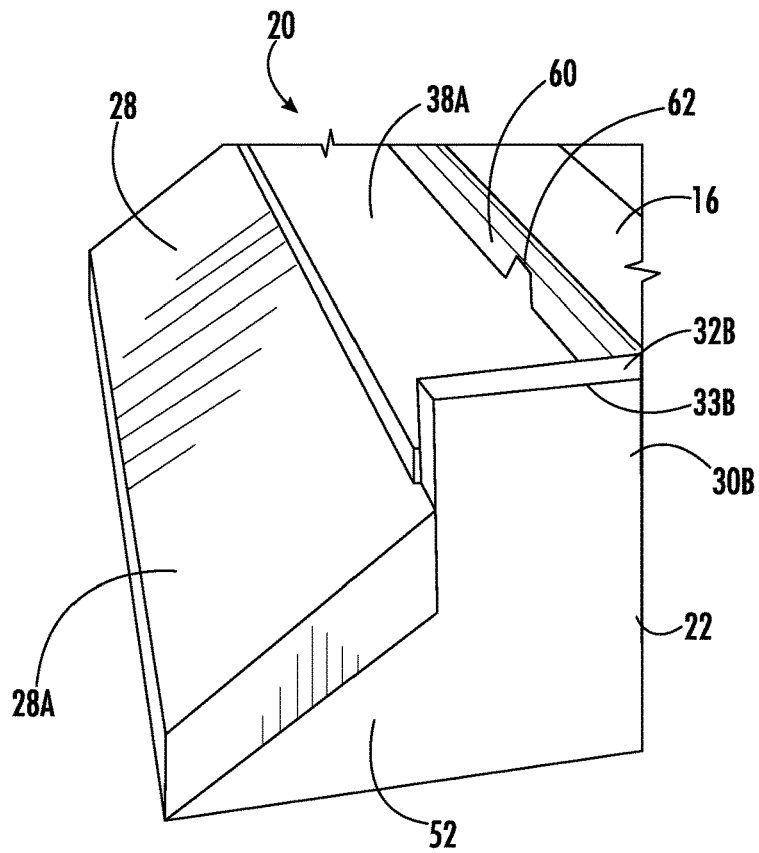
FIG. 11 illustrates a partial top perspective view of the embodiment of the hive stand according to FIG. 2 showing embodiments of a landing board, a front cross member and a side wall of the hive stand according to the present subject matter.

Referring to FIGS. 7, 9, and 10, the stand body 22 can include a brace member 45 secured to and between the first and second side walls 30A, 30B of the stand body 22 proximate to the rear end 35 of the stand body 22. The brace member 45 can thus extend along the bottom of the stand 20 to help retain the first and second side walls 30A, 30B of the stand body 22 at the rear end 22 of the stand body 22 about parallel to each other along the length of the first and second side walls 30A, 30B of the stand body 22. In this manner, the brace member 45 can prevent the first and second side walls 30A, 30B of the stand body 22 from flaring at the rear end 35 of the stand body 22.

When the screen 50 is installed, the screen 50 allows the beetles, mites, and other nest waste W to fall from the brood chambers 12A, 12B to the litter tray 24B of the drawer 24. As shown in FIG. 12, the bottom surface 24C of the bottom portion of the litter tray 24B can have a sheet P, such as wax paper, that can be placed thereon such that the grid lines 54 are visible therethrough. The grid lines 54 can then be used to determine where the waste W is falling from the upper sections 12A, 12B, 16 of the beehive 10 as well as what kind of waste W is falling from specific locations within the beehive 10. Over time, the collection of waste W in this manner can allow collection of data about the beehive based on the where and what kind of waste W falls from upper sections of the beehive 10.

To secure the screen 50 to the stand body 22, the front top portion 38A can have a screen channel 46A in the top side of the rear end of the front top portion 38A. Similarly, the rear top portion 38B can have a screen channels 46A, 46B in the respective front and rear top portions 38A, 38B providing ledges on which the screen 50 can be secured. The depth of the screen channels 46A, 46B in the respective front and rear top portions 38A, 38B can be such that the screen 50, when installed on the stand body 22, is about flush with the top sides of the front and rear top portions 38A, 38B. So, the depth of the screen channels 46A, 46B can depend on the thickness of the screen 50 that is to be used. For example, in some embodiments, the depth of the screen channels 46A, 46B in the respective front and rear top portions 38A, 38B can be about ⅛ inch. In some embodiments, the ledge formed by the screen channels 46A, 46B in the respective front and rear top portions 38A, 38B can be about ½ inch. To further help secure the screen 50, screen rails 44A, 44B can be secured to the inner wall faces of first and second side walls 30A, 30B as shown in FIGS. 7 and 10. The screen rails 44A, 44B can have a top surface that aligns with the screen channels 46A, 46B in the front and rear top portions 38A, 38B of the stand body 22 such that the top surface of the screen rails 44A, 44B are flush with the ledge formed by the screen channels 46A, 46B. The screen rails 44A, 44B and the ledges of the screen channels 46A, 46B provide surfaces to secure the screen 50 adjacent the first and second side walls 30A, 30B and the top portion 38 of the stand body 22. The size of the mesh within the screen 50 and the thickness of the screen 50 can vary depending on user preference. The mesh of the screen 50 should be a size that allows the bees to move around above the screen but be open enough to facilitate waste and pests passing through the screen 50.

In some embodiments, the rain guard 26 that extends from stand body 22 can extend from the rear top portion 38B of the stand body 22. As stated above, the rain guard 26 can have a slope surface extending outward from the rear top portion 38B such that the rain guard 26 overhangs the drawer front 24A to aid in preventing rain from entering the beehive stand 20 around the drawer 24. For example, the rain guard 26 can have a width RGD that allows the rain guard 26 to overhang the drawer front 24A. Further, as shown in FIGS. 2, 3, 8 and 10, a rear cross member 33C can be secured to the top side of the rear top portion 38B of the stand body 22 that extends between the upper portions 32A, 32B of the side walls 30A, 30B of the stand body 22. The rear cross member 33C and upper portions 32A, 32B of the side walls 30A, 30B of the stand body 22 can form supports 33A, 33B that with cross member 33C provide structure on which the lower section of the beehive 10, such as the slat rack 16 or a lower brood chamber 12B, for example, can reside when the beehive 10 is assembled. In some embodiments, the supports 33A, 33B can be separate structures secured to the top portion of the side walls 30A, 30B of the stand body 22 instead of being an integral part of the side walls 30A, 30B as shown in the figures. In some embodiments, the supports 33A, 33B, 33C, can provide enough space between the surface of the front top portion 38A of the stand body and the adjacent section of the beehive 10, such as the slat rack 16 as shown in FIG. 1, to form a wide entrance for the beehive 10 adjacent the landing board 28. This wide entrance can include an entrance reducer 60 having a smaller reducer entrance 62. The entrance reducer 60 can be installed within the wide entrance when needed to limit access to the beehive 10 and to regulate airflow within the beehive 10. In some embodiments, rain guard 26 can be secured to the cross member 33C. In some embodiments, the rain guard 26 and the cross member 33C can be a single unitary structure. In some embodiments, the rain guard 26 can be secured to the rear end 35 of the stand body 22.

The beehive stand 20 as described above provides a screen 50, a litter tray 24B, and a bottom board 40 all within a singular structure. This allows the beehive stand 20 to provide a structure that can separate debris from the colony to allow it to be regularly clean it without taking down the hive stack of the beehive 10, while preventing pest from climbing back up into the beehive 10 as much as possible without use of liquid in the litter tray 24B. Additionally, the beehive stand 20 allows for examination of the debris for hive management (especially during medical treatment for further study). The beehive stand 20 allows for monitoring winter activity and clustering, while also permitting discard of excess water & sugar which fall into the tray from winter candy board that is used to prevent colony loss due to starvation and provide insulation to keep bees from winter chilling effects. Further, the beehive stand 20 provides the ability to keep the bottom of beehive free of other pests, such as ants, spiders, or the like. In warmer conditions, the beehive stand 20 provides the option of an open bottom by removing the drawer 24 and the bottom board 40 to allow debris fall to the ground in warm weather conditions, while, at the same time, minimize water infiltration which accelerates need for maintenance and contributes to ambient humidity within the beehive.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only, and is not intended to limit the present subject matter.

What is claimed is:

1. A beehive stand for use as a base of a beehive, the beehive stand comprising:
   a stand body comprising a first side wall and a second side wall and a top portion having an opening therethrough, each of the first and second side walls comprising an inner wall face with a drawer slide groove and a bottom board slide groove in the respective inner wall face of the respective first and second side wall, the inner wall faces of first and second side walls facing each other such that the drawer slide grooves in the respective inner wall faces align and the bottom board slide grooves in the respective inner wall faces align;
   a drawer comprising a drawer front secured to a litter tray, the litter tray having side portions that are configured to slide along the drawer slide grooves in the respective first and second side walls to allow the drawer to be inserted and held within the stand body and removed from the stand body;
   a bottom board having side portions that are configured to slide along the bottom board slide grooves in the respective first and second side walls to allow the bottom board to be inserted and held within the stand body and removed from the stand body; and
   a screen secured to the top portion of the stand body covering the opening in the top portion, the screen residing above the litter tray of the drawer when the drawer is inserted in the stand body along the drawer slide grooves of the first and second side walls.

2. The beehive stand according to claim 1, wherein the stand body further comprises a landing board on a front end on the stand body that is sloped to provide a landing surface for bees and the drawer and bottom board being inserted into a rear end of the stand body opposite the front end with the landing board.

3. The beehive stand according to claim 2, wherein the top portion of the stand body comprises a front top portion that extends between the side walls and that extends above the landing board, the front top portion of the stand body comprises a front end and a rear end and a top side and a bottom side.

4. The beehive stand according to claim 3, wherein the front top portion has a landing board channel in the bottom side of the front end of the front top portion of the stand body for receiving a top portion of the landing board underneath the front top portion of the stand body.

5. The beehive stand according to claim 4, wherein the stand body comprises a front end wall that extends downward behind the landing board under the landing board channel in the front top portion of the stand body, the front end wall having an inner face with a drawer channel therein in which a front portion of the drawer tray is insertable and a bottom board channel therein in which a front portion of the bottom board is insertable.

6. The beehive stand according to claim 3, wherein the top portion of the stand body further comprises a rear top portion that extends between the side walls at the rear end of stand body, the rear top portion of the stand body comprises a front end and a rear end and a top side and a bottom side.

7. The beehive stand according to claim 6, wherein the rear top portion has a screen channel in the top side of the front end of the rear top portion and the front top portion has a screen channel in the top side of the rear end of the front top portion, the screen channels in the front and rear top portions providing ledges on which the screen can be secured.

8. The beehive stand according to claim 7, further comprising screen rails secured to the inner wall faces of first and second side walls, the screen rails having a top surface that aligns with the screen channels in the front and rear top portions of the stand body to secure the screen adjacent the first and second side walls.

9. The beehive stand according to claim 6, further comprising a rain guard extending from the rear top portion of the stand body, the rain guard having a slope surface extending outward from the rear top portion such that the rain guard overhangs the drawer front to aid in preventing rain from entering the beehive stand around the drawer.

10. The beehive stand according to claim 6, further comprising a rear cross member secured to the top side of the rear top portion of the stand body that extends between an upper portion of the first and second side walls of the stand body, the rear cross member and the upper portions of the first and second side walls forming supports on which a section of the beehive resides when the beehive is assembled.

11. The beehive stand according to claim 1, wherein the litter tray of the drawer comprises a bottom portion having a bottom surface with front and rear end walls and side walls extending upward from the bottom surface of the bottom portion.

12. The beehive stand according to claim 11, wherein the bottom surface of the bottom portion of the litter tray comprises grid lines thereon for visual referencing and collection of metrics related to waste that falls from chambers of the beehive.

13. The beehive stand according to claim 11, wherein the drawer front of the drawer is secured to the rear end wall of the litter tray.

14. A beehive comprising:
a beehive stand comprising:
a stand body comprising a first side wall and a second side wall and a top portion having an opening therethrough, each of the first and second side walls comprising an inner wall face with a drawer slide groove and a bottom board slide groove in the respective inner wall face of the respective first and second side wall, the inner wall faces of first and second side walls facing each other such that the drawer slide grooves in the respective inner wall faces align and the bottom board slide grooves in the respective inner wall faces align;
a drawer comprising a drawer front secured to a litter tray, the litter tray having side portions that are configured to slide along the drawer slide grooves in the respective first and second side walls to allow the drawer to be inserted and held within the stand body and removed from the stand body;
a bottom board having side portions that are configured to slide along the bottom board slide grooves in the respective first and second side walls to allow the bottom board to be inserted and held within the stand body and removed from the stand body; and
a screen secured to the top portion of the stand body covering the opening in the top portion, the screen residing above the litter tray of the drawer when the drawer is inserted in the stand body along the drawer slide grooves of the first and second side walls;
one or more brood chambers positioned above the beehive stand; and
covers that reside above the one or more brood chambers.

15. The beehive according to claim 14, wherein the stand body further comprises a landing board on a front end on the stand body that is sloped to provide a landing surface for bees and the drawer and bottom board being inserted into a rear end of the stand body opposite the front end with the landing board.

16. The beehive according to claim 15, wherein the top portion of the stand body comprises:
a front top portion that extends between the side walls and that extends above the landing board, the front top portion of the stand body comprises a front end and a rear end and a top side and a bottom side; and
a rear top portion that extends between the side walls at the rear end of stand body, the rear top portion of the stand body comprises a front end and a rear end and top side and a bottom side with the opening residing between the front top portion and the rear top portion of the stand body.

17. The beehive according to claim 16, wherein the front top portion has a landing board channel in the bottom side of the front end of the front top portion of the stand body for receiving a top portion of the landing board underneath the front top portion of the stand body.

18. The beehive according to claim 17, wherein the stand body comprises a front end wall that extends downward behind the landing board under the landing board channel in the front top portion of the stand body, the front end wall having an inner face with a drawer channel in which a front portion of the drawer tray is insertable and a bottom board channel in which a front portion of the bottom board is insertable.

19. The beehive according to claim 17, wherein the rear top portion has a screen channel in the top side of the front end of the rear top portion and the front top portion has a screen channel in the top side of the rear end of the front top portion, the screen channels in the front and rear top portions providing ledges on which the screen can be secured.

20. The beehive according to claim 17, further comprising a rain guard extending from the rear end of the stand body, the rain guard having a slope surface extending outward from the rear top portion such that the rain guard overhangs the drawer front to aid in preventing rain from entering the beehive stand around the drawer.

21. The beehive according to claim 14, wherein the litter tray of the drawer comprises:
   a bottom portion having a bottom surface with front and rear end walls and side walls extending upward from the bottom surface of the bottom portion; and
   the bottom surface of the bottom portion of the litter tray comprises grid lines thereon for visual referencing and collection of metrics related to waste that falls from chambers of the beehive.

* * * * *